H. J. FARMER.
LAWN MOWER.
APPLICATION FILED MAY 29, 1916.

1,216,676.

Patented Feb. 20, 1917.
2 SHEETS—SHEET 1.

WITNESSES:
Frank A. Sable
Josephine Gasper

INVENTOR
Herbert J. Farmer,
BY
Hood & Ashley
ATTORNEYS

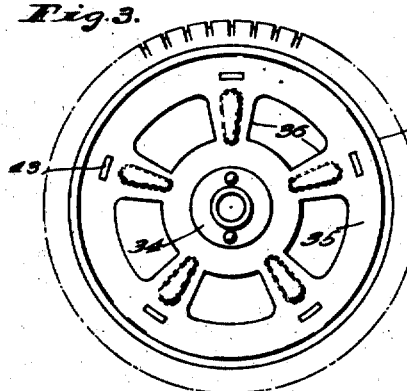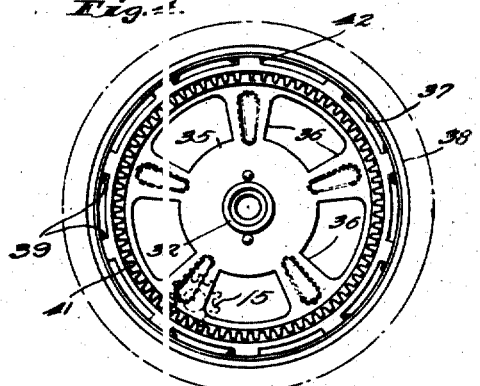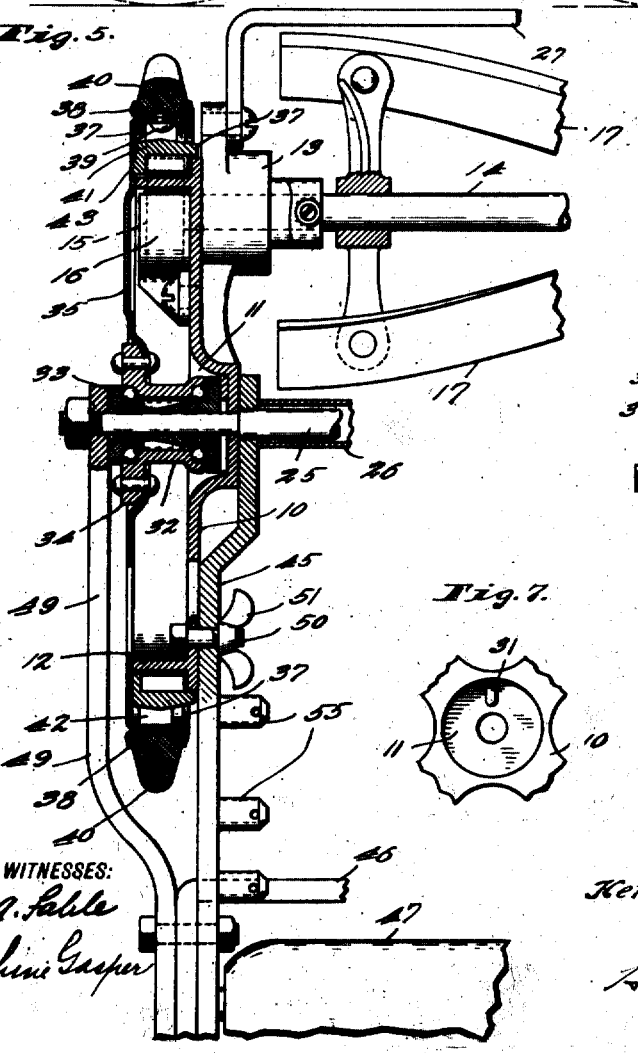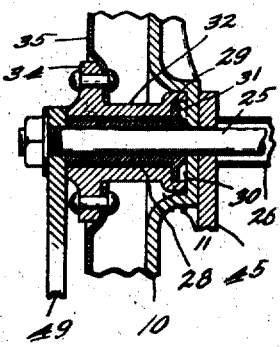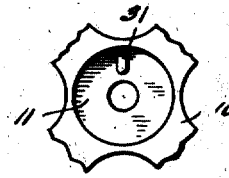

UNITED STATES PATENT OFFICE.

HERBERT J. FARMER, OF RICHMOND, INDIANA.

LAWN-MOWER.

1,216,676.

Specification of Letters Patent.

Patented Feb. 20, 1917.

Application filed May 29, 1916. Serial No. 100,447.

*To all whom it may concern:*

Be it known that I, HERBERT J. FARMER, a citizen of the United States, residing at Richmond, in the county of Wayne and State of Indiana, have invented a new and useful Lawn-Mower, of which the following is a specification.

It is the object of my invention to provide a lawn mower in which the cutting element, comprising the revolving and fixed blades, may be assembled as a unit and adjustably mounted with relation to the drive wheels; in which the revolving and fixed blades may be relatively adjustable so that they can always be made to coöperate throughout their length; in which the guide roller at the rear of the mower may always be held down against the ground, and the handle always yieldingly held up; in which the drive wheels may be made of punchings of sheet metal, and may be provided with rubber tires; and in which the drive wheels may be mounted on interchangeable and removable trunnions or bearing pins which can be adjusted to different positions so as to wear uniformly and which can be replaced easily and inexpensively.

Figure 1:
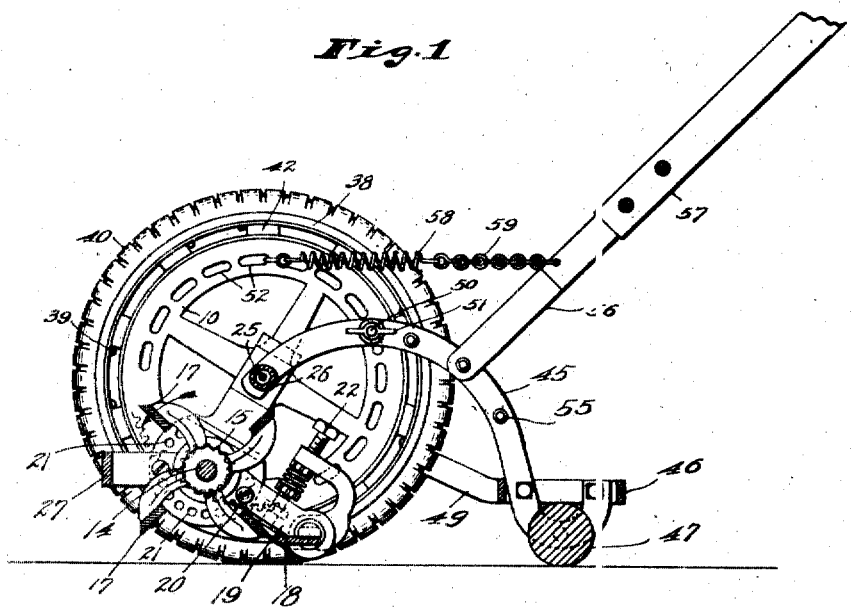
Figure 2:
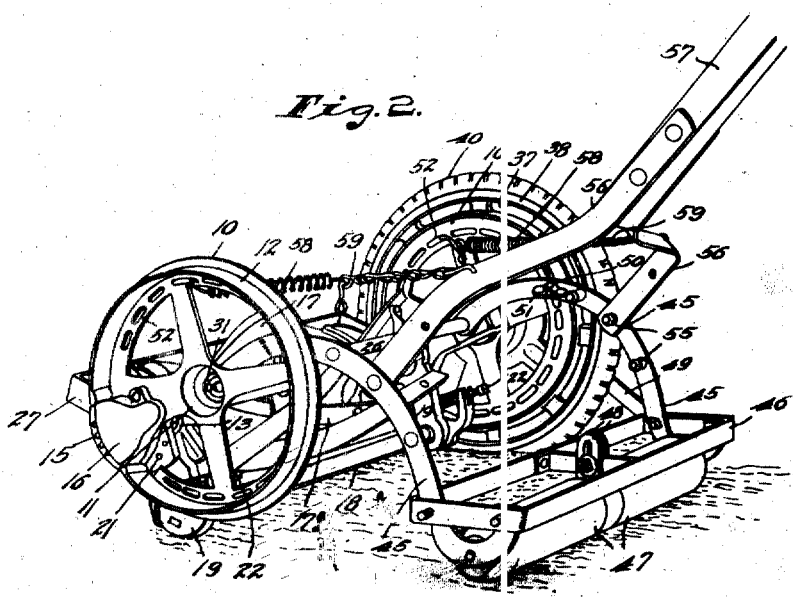

The acompanying drawings illustrate my invention. Figure 1 is a section through a lawn mower embodying my invention, the section being taken at right angles to the axis; Fig. 2 is a perspective view of such lawn mower, with one drive wheel removed; Fig. 3 is an elevation of one of the drive wheels, taken from the outside; Fig. 4 is a similar elevation of the drive wheel, taken from the inner side; Fig. 5 is a partial horizontal section taken through the axis of the drive wheel, showing one of the drive wheels and part of the cutting element, this figure showing a ball-bearing mounting for the drive wheel; Fig. 6 is a fragmentary view similar to a part of Fig. 5, but showing the drive wheel mounting without ball bearings; and Fig. 7 is an elevation of the center of one of the end plates, taken from the outside.

The cutting element has two circular end plates 10, each provided on the outer face at the center with a recess 11 and near the outer edge with an annular flange 12. Each end plate is provided on its inner face at one point near its periphery with a bearing 13 for a cutter reel shaft 14, which projects through the bearings 13 and is provided at its ends with the usual driving ratchet pinions 15, the annular flanges 12 being cut away at such pinions to allow the latter to project through to mesh with drive gears, covers 16 may be provided for the pinions 15. The shaft 14 carries the usual revolving cutter blades 17, which coöperate with a stationary blade 18 supported at its ends on two arms 19. These arms are attached to the end plates 10 by bolts 20, which may be placed in different ones of series of holes 21 arranged in a circle around the shaft 14; so that by shifting the bolts 20 from one set of holes 21 to another the fixed blade 18 may be adjusted around the shaft 14. The fixed blade 18 is also adjustable on the arms 19 by bolts 22, in substantially the same way as that described in my Patent No. 1,172,444 granted February 22, 1916, but the details of this adjustment are not material here.

The end plates 10 are perforated centrally to allow the passage of a central tie bolt 25, which joins the two end plates, and a sleeve or pipe 26 is mounted on the central portion of the bolt 25 and spaces apart the two end plates 10, which may also be joined, if desired, by a U-shaped spacing bar 27, for procuring greater rigidity. On the projecting ends of the bolt 25 are mounted bearing pins or trunnions 28, which at their inner ends have flanges 29 which are seated within the recess 11. The flange 29 of each trunnion has a plurality of notches 30, two notches usually being sufficient, any one of which when the trunnion is in place receives a lug 31 fixed on the end plate 10 in the bottom of the recess 11, so as to lock the trunnion to the end plate. By moving the trunnion outward slightly to disengage the notch 30 from the lug 31, it can be turned to bring another notch 30 into operative relationship with the lug 31, so that when the trunnion wears in one place it can be shifted to bring an unworn portion to a place where wear occurs. Mounted on the trunnion 28 are the hubs 32 of the drive wheels, these hubs being mounted on the trunnions either directly, as shown in Fig. 6, or on ball bearings, as shown in Fig. 5; in the latter case the trunnions and hubs being provided with ball races and a suitable ball cone 33 being provided.

Each drive wheel consists of the hub 32; which at its outer end has an outwardly projecting flange 34; a sheet metal stamping 35 which forms the web of the wheel and is conveniently cut away to form spokes 36, and at its outer edge is provided with an inturned flange 37; a stamped sheet metal rim 38 of channel shape, fastened to the flange 37 by rivets 39; a rubber tire 40 mounted in the rim 38; and a cast internal gear 41 mounted within the flange 37 and against the inner face of the web 35 beyond the spokes 36, which internal gear has outwardly projecting feet 42 which bear against the inner face of the flange 37 and which bear against opposite sides of the heads of the rivets 39 so as to lock the internal gear against relative turning within the flange 37, and may also have lugs 43 which project through openings in the wheel web to provide a further interlock.

Two curved arms 45 are mounted on the bolt 25 between the ends of the sleeve 26 and the inner faces of the end plates 10, and at their rear ends are reversely curved to provide two points of attachment to the roller frame 46 and to provide end bearings for the roller 47, as clear from Figs. 1 and 2. The roller 47 is made sectional, and its center bearings are provided by arms 48 clamped to a central cross piece of the roller frame 46. The roller frame 46 is also connected to the bolt 25 by two outer arms 49, which at their forward ends are pivotally mounted on the bolt 25 on the outer sides of the drive wheels, and at their rear ends are bolted to the roller frame 46 by the same bolts which connect the arms 45 to such frame. The arms 45 and 49 and the roller frame 46 together form the main positioning frame. The arms 45 lie closely against the end plates 10 near the periphery thereof, and are bolted to such end plates at such points by bolts 50 having wing nuts 51. The bolts 50 pass through holes 52 provided in the end plates 10 and arranged in circular series about the centers of the end plates, the holes 52 being circumferentially elongated so that the bolts 50 may be slid along such holes. By this means it is possible to adjust the two end plates slightly differently, so that a slight twist may be obtained in the revolving cutter reel and in the stationary cutter blade 18. By this twisting, it is possible to make the revolving blades of the cutter reel strike the stationary blade 18 properly throughout their length, in case a condition arises, as sometimes happens due to a wrenching of the machine in use, where the revolving and stationary blades tend to strike properly at one end only. By shifting the bolts 50 to different holes 52, the revolving cutter reel may be brought either to the front or to the rear of the vertical plane of the central bolt 25, being shown as to the front of such plane in Figs. 1, 2, and 5. When the bolts 50 are in the desired holes 52, so as to obtain the desired position of the revolving cutter reel, and are adjusted in the two end plates 10 to proper positions in such holes so as to produce coöperation of the revolving and stationary blades throughout their length, the wing nuts 51 are tightened to lock the end plates in this position relative to the arms 45 and roller frame 46. Thus the cutting element as a whole may be adjusted, and proper coöperation of the parts of the cutting element may be obtained, by the bolts 50 in the holes 52.

The arms 45 are provided on their inner faces with a plurality of inwardly projecting circular lugs 55, any pair of which may be made to project through the pivot holes in the lower ends of the springs arms 56 by which the operating handle 57 is mounted. By shifting the springs arms 56 from one pair of pins 55 to another, the line of thrust of the handle on the mower may be shifted, so as to get the best advantage under any given conditions, and so as to hold the roller 47 down against the ground with just sufficient force to prevent it from tilting upward due to the reaction of the cutting element. The spring arms 56 are connected by tension springs 58 to the end plates 10, a chain 59 being provided for attaching one end of each spring 58 so that by dropping links of such chains the slant at which the springs 58 hold the handle 57 may be adjusted.

I claim as my invention:

1. In a lawn mower, a drive wheel comprising a sheet metal web having a peripheral annular flange, a rim channel riveted to said flange, a rubber tire mounted on said rim channel, and an internal gear mounted within said peripheral flange and coöperating with the heads of the rivets which hold the rim channel in place to lock the gear and web against relative turning, in combination with a cutting element having a pinion meshing with said internal gear and an end plate which coöperates with said sheet metal web to hold the internal gear in proper locking relationship to said rivets.

2. In a lawn mower, a drive wheel comprising a sheet metal web having a peripheral annular flange, a rim riveted to said flange, and an internal gear mounted within said peripheral flange and coöperating with the heads of the rivets which hold the rim in place to lock the gear and web against relative turning, in combination with a cutting element having a pinion meshing with said internal gear and an end plate which coöperates with said sheet metal web to hold the internal gear in proper locking relationship to said rivets.

3. In a lawn mower, a drive wheel comprising a sheet metal web having a peripheral annular flange and provided with projections, and an internal gear mounted within said annular flange and provided with portions which coöperate with said projections to lock the web and gear against relative turning, in combination with a cutting element having a pinion meshing with said internal gear and an end plate which coöperates with said sheet metal web to hold the internal gear in proper locking relationship to said projections.

4. In a lawn mower, the combination of a pair of drive wheels, a roller, a frame joining the drive wheels and roller, cutting blades, an operating handle, and means for pivotally attaching said handle to said frame at different points.

5. In a lawn mower, the combination of a pair of drive wheels, a roller, a frame joining the roller and drive wheels, an operating handle, said frame and handle being provided with coöperating parts by which the handle can be pivotally attached to the frame at different points between the axis of the drive wheels and the axis of the roller, and a cutting element mounted in said frame and adjustable around the axis of the drive wheel.

6. In a lawn mower, the combination of a pair of drive wheels, a roller, a frame joining the roller and drive wheels, and an operating handle, said frame and handle being provided with coöperating parts by which the handle can be pivotally attached to the frame at different points between the axis of the drive wheels and the axis of the roller.

7. In a lawn mower, the combination of a pair of drive wheels, a roller behind the drive wheels, a frame joining the drive wheels and roller, an operating handle pivotally mounted on said frame between the drive wheels and the roller, a tension spring connecting said handle and said frame for holding the handle raised, and a chain by which said tension spring is attached at one end so that by dropping links of said chain the angle of the handle may be adjusted.

8. In a lawn mower, the combination of an end plate forming a support for the cutting elements of the lawn mower and centrally recessed on its outer face and provided with a central outwardly projecting member, a complete trunnion mounted on said outwardly projecting member and seated in said recess, said trunnion and the bottom of the recess in said end plate being provided with coöperating interlocking parts which interlock for a plurality of positions of said trunnion about said outwardly projecting member, and a drive wheel mounted on said trunnion.

9. In a lawn mower, the combination of an end plate forming a support for the cutting elements of the lawn mower and provided with a central outwardly projecting member, a complete trunnion mounted on said outwardly projecting member, said trunnion and said end plate being provided with coöperating interlocking parts which interlock for a plurality of positions of said trunnion about said outwardly projecting member, and a drive wheel mounted on said trunnion.

10. In a lawn mower, the combination of a pair of driving wheels, a roller, a frame joining the rollers and the driving wheels and pivotally mounted on the axis of the driving wheels, a cutting element mounted for adjustment around the axis of the driving wheels, said cutting element including a revolving reel and a fixed cutter blade and a pair of end plates carrying said reel and blade, and means for fastening each of said end plates to said frame, said fastening means including a bolt and coöperating holes in said frame and end plates, and the holes in one of such parts being elongated circumferentially about the axis of the driving wheels.

11. In a lawn mower, the combination of a pair of driving wheels, a roller, a frame joining the rollers and the driving wheels and pivotally mounted on the axis of the driving wheels, a cutting element mounted for adjustment around the axis of the driving wheels, said cutting element including a revolving reel and a fixed cutter blade and a pair of end plates carrying said reel and blade, said end plates being provided with series of holes arranged concentrically with the axis of the driving wheels and elongated circumferentially, and bolts passing through said holes for fastening the end plates to said frame.

12. In a lawn mower, the combination of a pair of end plates, fixed and movable cutting blades mounted thereon, a stationary central bolt joining and projecting through said end plates, a tube surrounding said central bolt and spacing said end plates apart, drive wheels rotatably mounted on said central bolt beyond the end plates, a frame provided with a roller and mounted on said central bolt, and means for adjustably attaching said end plates to said frame so that the end plates and cutting blades can be adjusted circumferentially around the central bolt.

13. In a lawn mower, the combination of a pair of end plates, fixed and movable cutting blades mounted thereon, a stationary central bolt joining and projecting through said end plates, a tube surrounding said central bolt and spacing said end plates apart, drive wheels rotatably mounted on said central bolt beyond the end plates, and a frame provided with a roller and mounted on said central bolt.

14. In a lawn mower, the combination of a pair of end plates, fixed and movable cutting blades mounted thereon, a stationary central bolt joining and projecting through said end plates and carrying means for spacing the end plates apart, drive wheels rotatably mounted on said central bolt beyond the end plates, and a frame provided with a roller and mounted on said central bolt between said end plates.

15. In a lawn mower, the combination of a pair of end plates, fixed and movable cutting blades mounted thereon, a stationary central bolt joining and projecting through said end plates and carrying means for spacing the end plates apart, drive wheels rotatably mounted on said central bolt beyond the end plates, and a frame provided with a roller and mounted on said central bolt.

In witness whereof, I HERBERT J. FARMER have hereunto set my hand at Richmond, Indiana, this 23d day of May, A. D. one thousand nine hundred and sixteen.

HERBERT J. FARMER.

Witness:
REGINA M. BRODERICK.